United States Patent
Kao et al.

(10) Patent No.: US 10,769,006 B2
(45) Date of Patent: Sep. 8, 2020

(54) ENSEMBLE RISK ASSESSMENT METHOD FOR NETWORKED DEVICES

(71) Applicant: Cisco Technology, Inc., San Jose, CA (US)

(72) Inventors: Nidhi Kao, Charlotte, NC (US); Ulf Vinneras, Los Gatos, CA (US); John W. Garrett, Jr., Apex, NC (US)

(73) Assignee: CISCO TECHNOLOGY, INC., San Jose, CA (US)

(*) Notice: Subject to any disclaimer, the term of this patent is extended or adjusted under 35 U.S.C. 154(b) by 16 days.

(21) Appl. No.: 16/050,370

(22) Filed: Jul. 31, 2018

(65) Prior Publication Data
US 2020/0042370 A1 Feb. 6, 2020

(51) Int. Cl.
| | |
|---|---|
| *G06F 11/00* | (2006.01) |
| *G06Q 10/06* | (2012.01) |
| *G06F 11/07* | (2006.01) |
| *G06K 9/62* | (2006.01) |
| *G06F 17/18* | (2006.01) |

(Continued)

(52) U.S. Cl.
CPC ........ *G06F 11/008* (2013.01); *G06F 11/0709* (2013.01); *G06F 11/0751* (2013.01); *G06F 17/18* (2013.01); *G06K 9/6223* (2013.01); *G06K 9/6276* (2013.01); *G06N 3/04* (2013.01); *G06N 20/00* (2019.01); *G06Q 10/0635* (2013.01); *H04L 41/0816* (2013.01)

(58) Field of Classification Search
CPC .... G06F 11/004; G06F 11/0751; G06F 11/30; G06F 11/3409; G06F 11/3452; G06F 11/008; G06F 11/079; G06F 2201/87

USPC ........................................................ 714/47.1
See application file for complete search history.

(56) References Cited

U.S. PATENT DOCUMENTS 7,752,125 B1    7/2010 Kothari et al.
10,216,558 B1*  2/2019 Gaber ................. G06F 11/0727
(Continued)

FOREIGN PATENT DOCUMENTS

WO     2017/133492 A1     8/2017

OTHER PUBLICATIONS

Lahsasna, et al., "Credit Scoring Models Using Soft Computing Methods: A Survey," The International Arab Journal of Information Technology, vol. 7, No. 2, Apr. 2010, 11 pages.
(Continued)

*Primary Examiner* — Sarai E Butler
(74) *Attorney, Agent, or Firm* — Edell, Shapiro & Finnan, LLC (57) ABSTRACT

A management entity receives device fingerprints representing corresponding devices connected to one or more networks. Each device fingerprint includes a multi-bit word indicating hardware, software, network configuration, and failure features for a corresponding one of the devices. The management entity processes the device fingerprints using different methods including statistical risk of failure scoring methods and machine learning risk of failure scoring methods, to produce from each of the methods a respective risk of failure for each device. The management entity combines the respective risk of failures for each device into a composite risk of failure for each device, ranks the devices based on the composite risk of failures for the devices, to produce a risk ranking of the devices, and outputs the risk ranking.

20 Claims, 10 Drawing Sheets

(51) Int. Cl.
*G06N 3/04* (2006.01)
*H04L 12/24* (2006.01)
*G06N 20/00* (2019.01)

(56) References Cited

U.S. PATENT DOCUMENTS

| | | | |
|---|---|---|---|
| 2009/0172034 A1* | 7/2009 | Aoyama | G06F 11/0787 |
| 2012/0296891 A1* | 11/2012 | Rangan | G06F 16/3347 |
| | | | 707/722 |
| 2015/0271008 A1* | 9/2015 | Jain | G06F 11/079 |
| | | | 714/57 |
| 2016/0110819 A1 | 4/2016 | Abramowitz | |
| 2016/0239665 A1 | 8/2016 | Hamby | |
| 2016/0371618 A1 | 12/2016 | Leidner et al. | |
| 2017/0039479 A1 | 2/2017 | Chen | |
| 2017/0316318 A1* | 11/2017 | O'Brien | G06N 5/04 |
| 2017/0337345 A1* | 11/2017 | Pauws | G16H 10/60 |
| 2018/0174067 A1* | 6/2018 | Spiro | G05B 23/0221 |
| 2018/0203978 A1* | 7/2018 | Basu | G16H 50/70 |
| 2018/0225588 A1* | 8/2018 | Khidekel | G06Q 30/06 |
| 2018/0308026 A1* | 10/2018 | Sinha | H04L 63/1441 |
| 2018/0330241 A1* | 11/2018 | Seaton | G06Q 10/06 |
| 2019/0095551 A1* | 3/2019 | Chidambarrao | G06F 17/505 |
| 2019/0108888 A1* | 4/2019 | Sarkar | G06N 20/00 |
| 2019/0196899 A1* | 6/2019 | Sylvester, II | G06Q 20/023 |
| 2019/0303731 A1* | 10/2019 | Yang | G06K 9/6267 |
| 2019/0370139 A1* | 12/2019 | Vichare | G06F 9/44505 |

OTHER PUBLICATIONS

Santos, et al., "Method of Automated Cyber Risk Assessment, Insurance Underwriting, and Remediation," IP.com Prior Art Database Technical Disclosure, Aug. 2017, 8 pages.

* cited by examiner

ENSEMBLE RISK ASSESSMENT METHOD FOR NETWORKED DEVICES

TECHNICAL FIELD

The present disclosure relates to monitoring networked devices for operational risk.

BACKGROUND

Customer networks and devices belonging to those networks number in the millions. Network administrators are charged with monitoring the customer networks and their devices, finding problems with the networks, and fixing the problems. Network administrators may encounter issues with their networks at any given time and, in conventional practice, implement "reactive" responses to the issues. Reactive responses involve manually performing diagnostic tests to troubleshoot the issues. This approach does not allow the network administrators to proactively avoid the issues, nor does it provide information indicating optimal network configurations. Conventionally, an administrator of a network may use a single type of network monitoring or analysis model to alert customers to adverse events in the network proactively. Disadvantageously, the network model may not be well suited to a particular configuration of the network, or introduce biases inherent in the particular model, which leads to sub-optimal monitoring/analysis of the network.

DESCRIPTION OF EXAMPLE EMBODIMENTS

Overview

In one embodiment, a management entity receives device fingerprints representing corresponding devices connected to one or more networks. Each device fingerprint includes a multi-bit word indicating hardware, software, network configuration, and failure features for a corresponding one of the devices. The management entity processes the device fingerprints using different methods including statistical risk of failure scoring methods and machine learning risk of failure scoring methods, to produce from each of the methods a respective risk of failure for each device. The management entity combines the respective risk of failures for each device into a composite risk of failure for each device, ranks the devices based on the composite risk of failures for the devices, to produce a risk ranking of the devices, and outputs the risk ranking.

Example Embodiments

Figure 1:
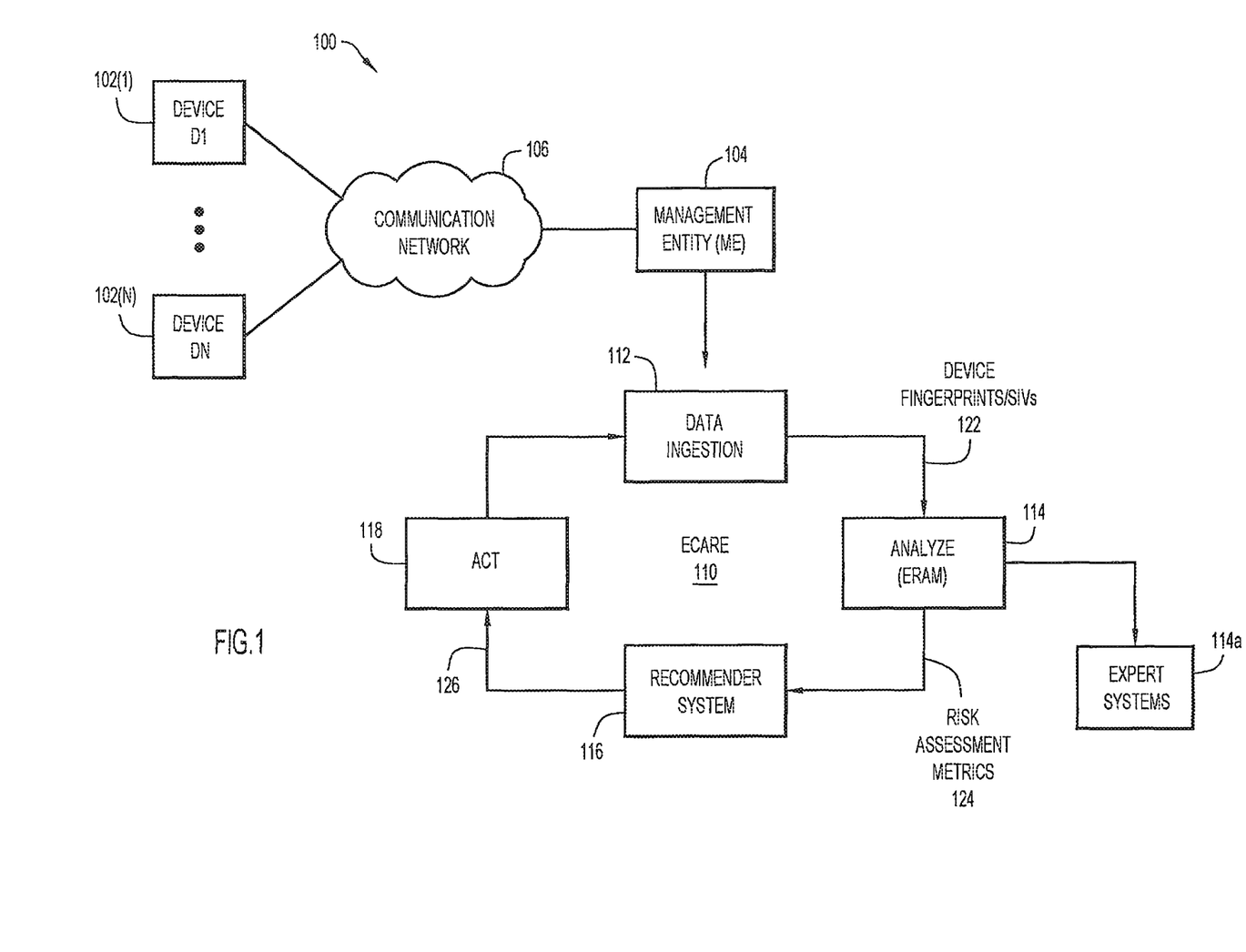
FIG. 1 is an illustration of a distributed network environment in which embodiments directed to risk assessment of network devices using an Ensemble Risk Assessment Method (ERAM) may be implemented, according to an example embodiment.

With reference to FIG. 1, there is an illustration of an example distributed network environment 100 in which embodiments directed to performing risk assessment of network devices using an Ensemble Risk Assessment Method (ERAM) may be implemented. Environment 100 includes devices 102(1)-102(N) (also referred to as devices D1-DN) and a management entity (ME) 104 each connected to, and configure to communicate with each other over, a communication network 106. Communication network 106 may include local area networks (LANs) and wide area networks (WANs), such as the Internet. Devices D1-DN, which may number in the millions, include any type of computer device configured to communicate with a wired or wireless network, including client devices, server devices, and network devices (e.g., switches and routers). Client devices D1-DN may include smartphones, computer laptops, and so on. Management entity 104 includes compute, network, and storage resources sufficient to implement the ERAM as described below, and may include one or more server devices, a cloud-based entity, and so on. Devices D1-DN and management entity 104 may exchange data packets with each other over communication network 106 using any known or hereafter developed communication protocols, including the suite of Internet Protocol (IP) protocols, for example.

At a high-level, management entity 104 implements an Environment Condition Analytics Risk Engine (ECARE) system 110 to monitor, analyze, and make recommendations regarding devices D1-DN operating in their respective networks, and also to receive information from and provide information related to the monitor, analysis, and recommendation operations to an administrator/user. High-level components of ECARE system 110 include data ingestion 112, ERAM 114, a recommender system 116, and an action (ACT) module 118. Data ingestion 112 identifies relevant device feature information to be collected from devices D1-DN, collects the information from the devices, and employs expert systems to generate device fingerprints 122 (also referred to as "State Information Vectors (SIVs)") for the devices based on expert systems modeling components. Device fingerprints 122 are provided to ERAM 114.

In accordance with embodiments presented herein, ERAM 114 processes device fingerprints 122 using an ensemble of different risk assessment methods (referred to as "risk of failure scoring methods" or simply "risk scoring methods"), including one or more statistical risk of failure scoring methods and one or more machine learning risk of failure scoring methods, to produce risk management metrics 124 indicative of risk of failures for devices D1-DN. The risk of failure scoring methods may employ multiple expert systems 114a. Each of risk assessment metrics 124 includes mathematical risk assessment contributions from all of the different risk of failure scoring methods, i.e., each of risk assessment metrics 124 represents a composite of the risk assessment contributions. ERAM 114 provides risk assessment metrics 124 to recommender system 116. Recommender system 116 provides recommendations 126 to action module 118 to remediate/reduce risk of failure in various ones of devices D1-DN as indicated in risk assessment metrics 124. Recommendations may include recommendations to change or update software versions hosted on devices, change or update hardware modules used in the devices, reconfigure network configurations of the devices, and so on. Action module 118 implements actions with respect to devices D1-DN based on recommendations 126.

Figure 2:
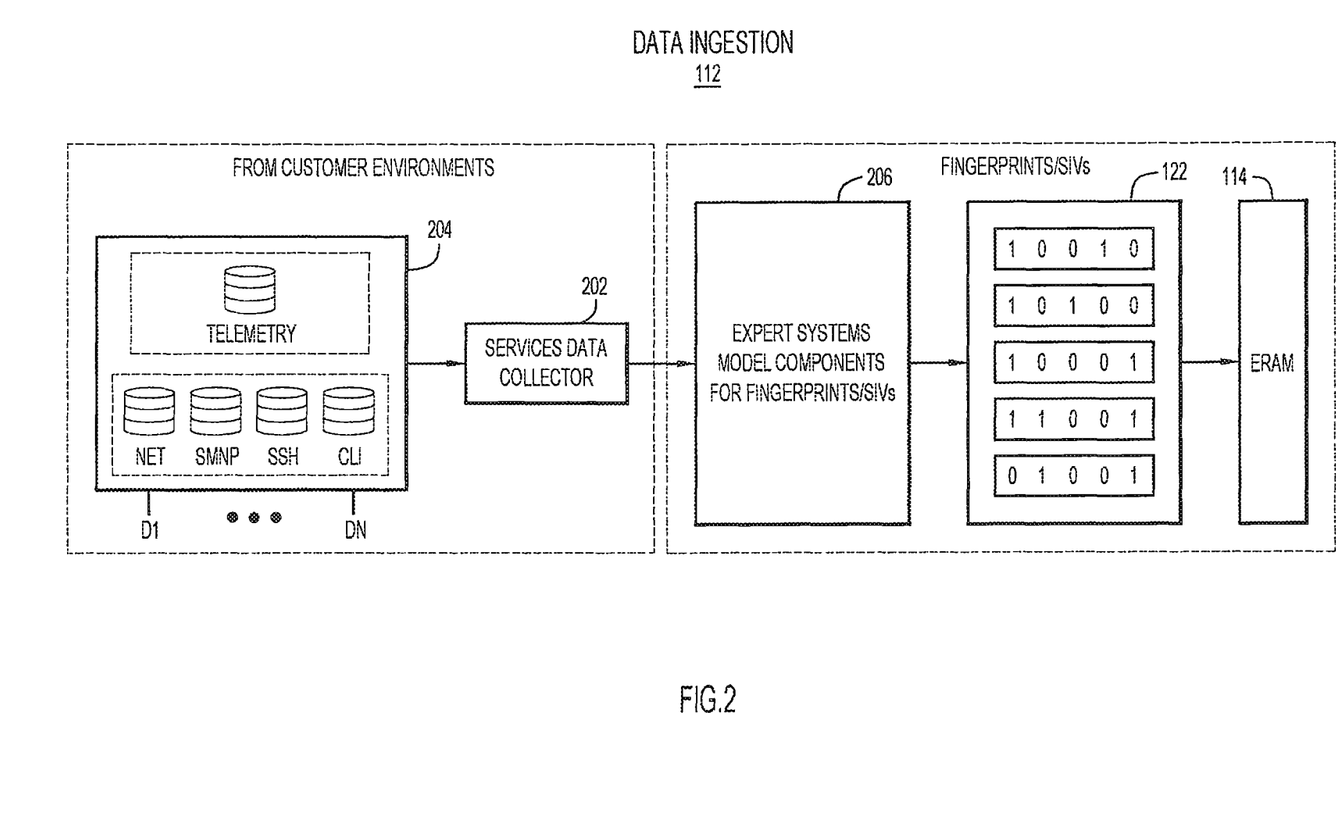
FIG. 2 is a block diagram of components and operations related to data ingestion of device information used to generate device fingerprints for the ERAM, according to an example embodiment.

With reference to FIG. 2, there is a block diagram of components and operations primarily related to data ingestion 112. Data ingestion 112 includes a services data collector 202 to collect device feature information from each of devices D1-DN over communication network 106 using multiple network related services, including, but not limited to, command line interfaces (CLIs), the Secure Shell (SSH) protocol, the Simple Network Management Protocol (SNMP), and "Net use" commands, collectively indicated at 204. Service data collector 202 also associates a unique device identifier (ID) (device ID) of each device with the device feature information collected from that device. Service data collector 202 provides the device feature information to a variety of expert system utilized by data ingestion 112 to generate device fingerprints/SIVs 122 from the device feature information. Each device fingerprint includes a multi-bit word corresponding to/associated with a corresponding one of devices D1-DN, i.e., there is one device fingerprint per device. Expert systems 206 provide device fingerprints 122 and their associated device IDs to ERAM 114, which processes the device fingerprints as described below. Because each device fingerprint is associated with/mapped to its unique device ID, ERAM 114 may translate any given device fingerprint to its associated device ID, and vice versa.

Figure 3:
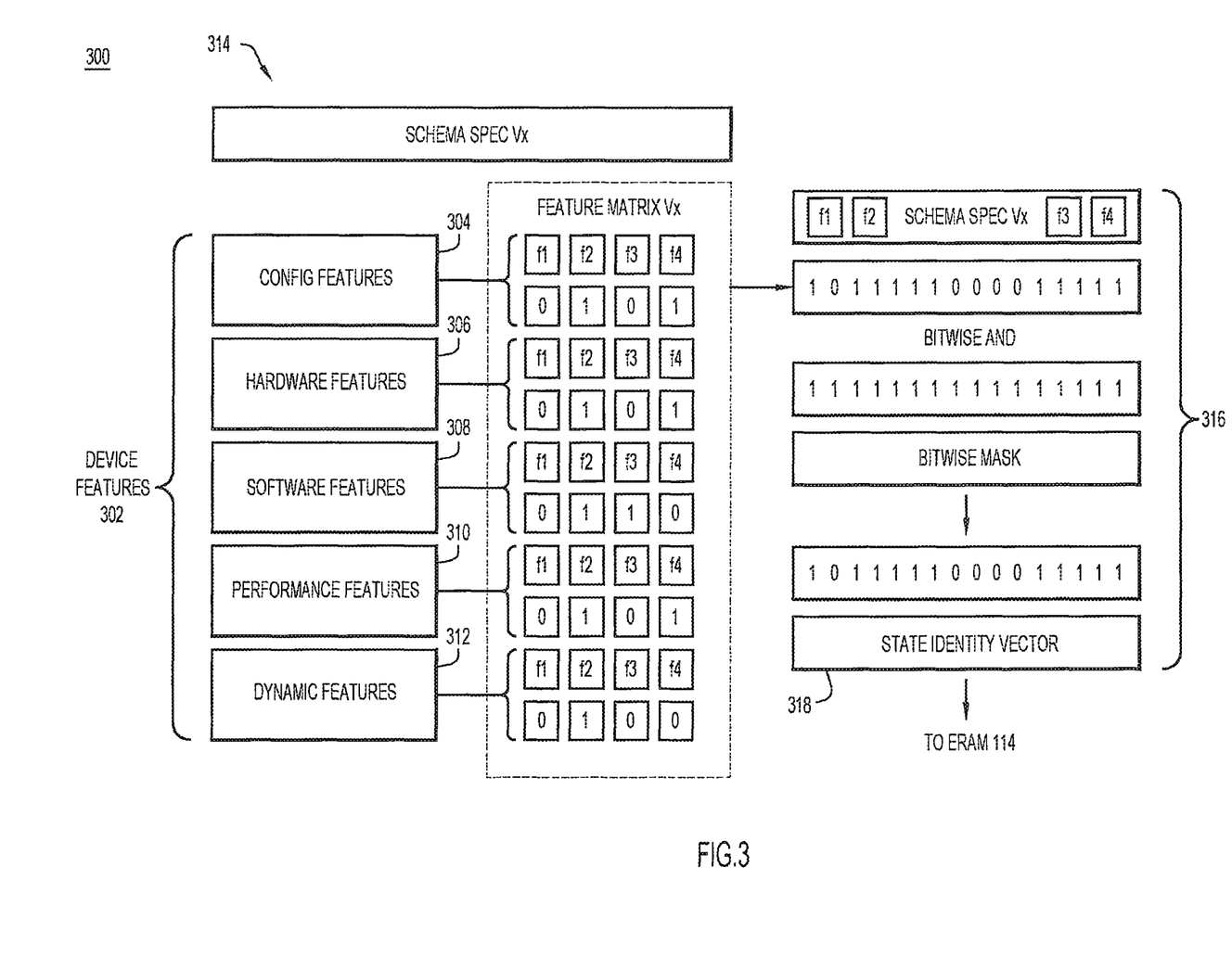
FIG. 3 is an illustration of a process for generating the device fingerprints, according to an example embodiment.

FIG. 3 is an illustration of an example process 300 for generating device fingerprints 122 performed by data ingestion 112. Data ingestion 112 receives for each device Di respective device feature information 302. Device feature information 302 describes different types or categories of device features, including: network configuration features 304 (e.g., whether the device supports or operates in accordance with different routing protocols, such as Open Shortest Path First (OSPF) or the Border Gateway Protocol (BGP)); hardware features 306 (e.g., a device hardware vendor model number); software features 308 (which operating system and versions thereof that the device supports/hosts); performance features 310; and dynamic features 312 (e.g., whether or not the device has experienced a failure or crash).

At 314, based on a predetermined schema specification "Schema Spec Vx" (where "V" represents "Version") that defines names of device features and bit positons of the device features in the device fingerprints/SIVs, data ingestion 112 compiles the different types of device features 304-312 into corresponding portions of a feature matrix Vx, as shown in FIG. 3. In feature matrix Vx, column labels "f1," "f2," and so on, represent different attributes of each feature type, and bit values "0" or "1" under each column label represent a presence or an absence of the corresponding feature attribute for the given device Di.

At 316, data ingestion 112 performs bitwise AND and masking operations on information for device Di from feature matrix Vx, to produce a device fingerprint/SIV 318. Data ingestion 112 provides device fingerprint/SIV 318 and its associated device ID to ERAM 114. Device fingerprint 318 includes a multi-bit word in which bit positions represents respective device features/attributes, and bit values, e.g., "1" or "0," populating those positions represent presence or absence of the corresponding features. In an example, the device ID may be concatenated with the device fingerprint.

Figure 4:
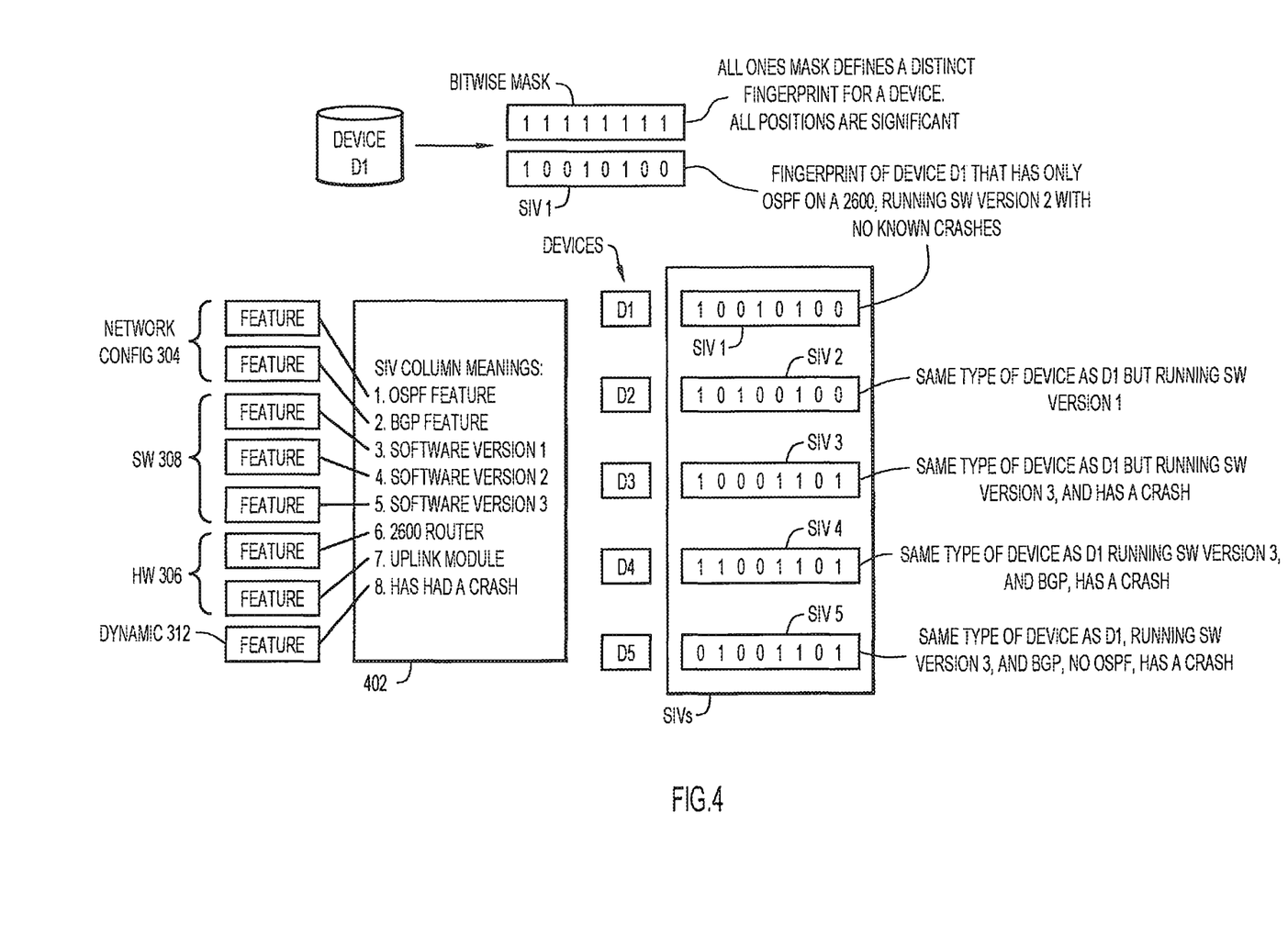
FIG. 4 is an illustration of device fingerprints for corresponding devices, according to an example embodiment.

With reference to FIG. 4, there is an illustration of example device fingerprints SIV1-IV5 for corresponding devices D1-D5. Each SIVi includes a multi-bit word (e.g., 8-bit word) defining the features of corresponding device Di. For example, device fingerprint SIV1=10010100. Each bit position of device fingerprint SIVi represents a corresponding feature as defined by "SIV Column Meanings" 402. For example, bit 1 indicates whether OSPF is supported, bit 2 indicates whether BGP is supported, bits 3-5 indicate which software version is supported, bits 6 and 7 indicate which router hardware is present, and bit 8 indicates whether the device has experienced a failure, such as a crash (1=YES, 0=NO).

In the example of FIG. 4, the device fingerprints indicate the following features:
a. Device D1 fingerprint SIV1 indicates that device D1 has only OSPF on a 2600 hardware device, running software version 2, with no known failures.
b. Device D2 fingerprint SIV2 indicates that device D2 is the same type of device as D1, but is running software version 2.
c. Device D3 fingerprint SIV3 indicates that device D3 is the same type of device as D1, but is running software version 3.
d. Device D4 fingerprint SIV4 indicates that device D4 is the same type of device as D1, but supports BGP and OSPF, is running software version 3, and has experienced a failure.
e. Device D5 fingerprint SIV5 indicates that device D5 is the same type of device as D1, supports BGP but not OSPF, is running software version 3, and has experienced a failure.

Figure 5:
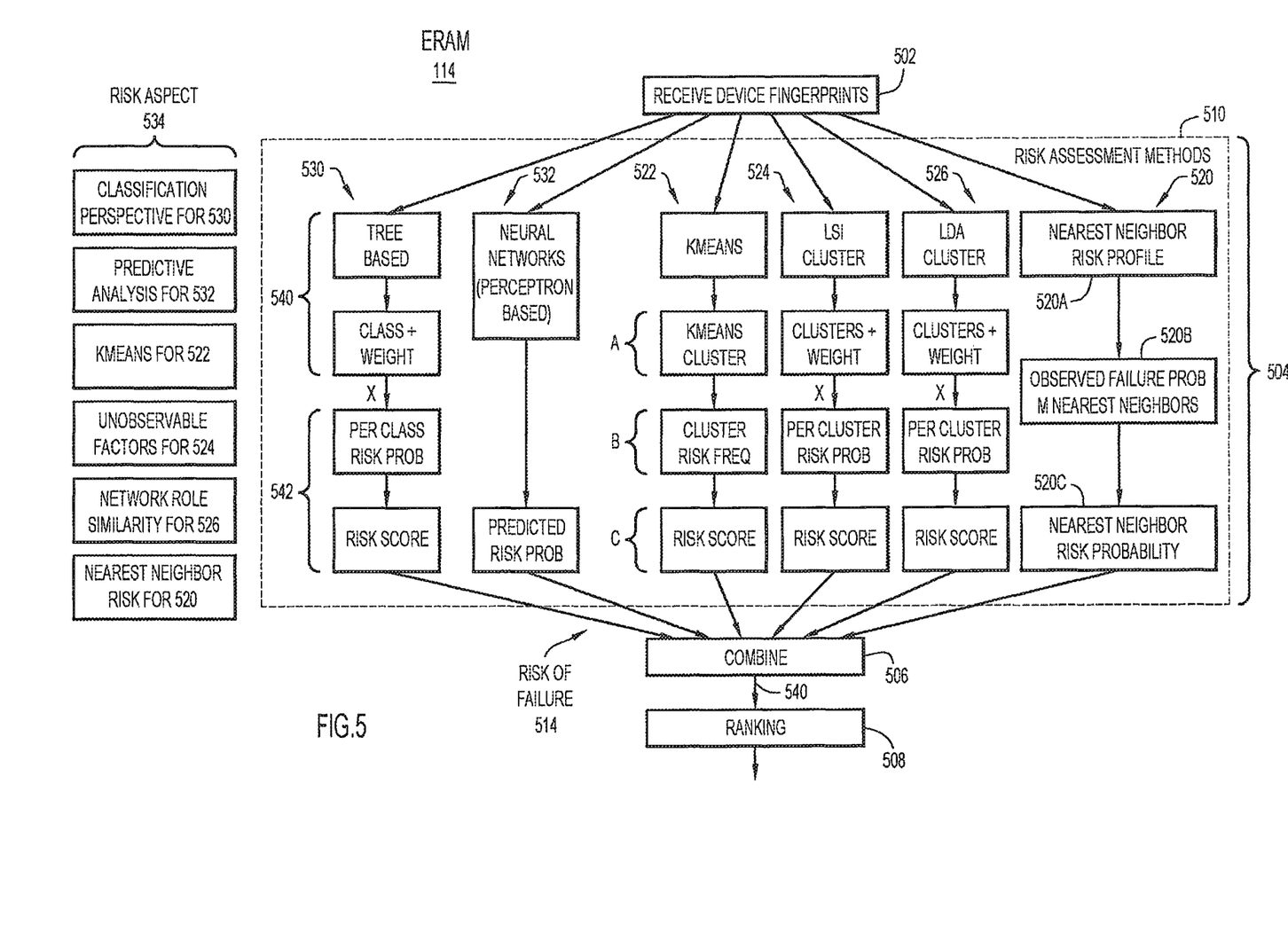
FIG. 5 is an illustration of the ERAM, according to an example embodiment.

With reference to FIG. 5, there is an illustration of an example of ERAM 114. FIG. 5 represents ERAM 114 as a sequence of high-level operations 502, 504, 506, and 508, described below.

At 502, ERAM 114 receives device fingerprints 122 (SIVs). As described above, each device fingerprint indicates hardware, software, network configuration, and failure features for a corresponding one of the devices D1-DN.

At 504, ERAM 114 processes each device fingerprint using an ensemble of different risk assessment methods 510, to produce from each of the methods a respective risk of failure or "risk score" (shown collectively at 514) for each device. Risk assessment methods 510 are referred to as "risk scoring methods" or simply "risk scoring," and include statistical risk of failure scoring methods and machine learning risk of failure scoring methods. Generally, operation 504 includes two passes through risk scoring methods 510. The first pass represents a training phase, which uses all known device fingerprints to generate for the risk scoring methods either known risk of failures for clusters/groups of the device fingerprints, or predictive models to predict the risk of failures for individual device fingerprints/SIVs. The second pass represents an application phase that applies the information generated in the training phase, i.e., the known risk of failures per cluster/group or the predictive models, to the individual device finger prints used for the training (or to new device fingerprints/SIVs not seen before) to generate risk of failures for those individual device fingerprints/SIVs. An example of the two passes will be discussed in further detail below in connection with FIGS. 7-9

The statistical risk of failure scoring methods include nearest-neighbor scoring method 520 and multiple types of cluster profile composition scoring methods (i.e., cluster processing methods), such as Kmeans cluster analysis 522 using Euclidean distance (referred to simply as "Kmeans"), Latent Semantic Indexing (LSI) analysis 524, and Latent Dirichlet Allocation (LDA) analysis 526. The machine learning scoring methods include a tree-based machine learning scoring method 530, which may use a random forest algorithm, and a neural network-based or perceptron-based scoring method 532. Risk assessment methods 520-532 may be performed concurrently or serially to process each device fingerprint. Only a subset of risk assessment methods 520-532 may be used. Also, risk assessment methods different from those shown in FIG. 5 may be used.

An advantage of using the ensemble of different risk assessment methods 510 is that the different methods consider/evaluate different aspects for determining risk. The different risk aspects, indicated at 534, include: a classification perspective for tree-based machine learning scoring method 530; predictive analytics for neural network-based or perceptron-based scoring method 532; feature similarity using Euclidean distance for Kmeans method 522; unobservable factors for method 524; network role similarity for method 526; and nearest neighbor risk for method 520.

At 506, ERAM 114 combines respective risk of failure scores 514 (i.e., the respective risk scores) for each device Di into a composite risk of failure 540 (also referred to as a "risk assessment metric") for each device. To do this, ERAM 114 may add, average, or otherwise combine respective risk of failures 514 into composite risk of failure 540.

At 508, ERAM 114 stack ranks devices D1-DN based on their corresponding composite risk of failures, to produce a risk ranking list of the devices, and outputs the list. The list may be output to a user interface for display to a user, may be output to a webpage, or output to recommender system 116. Also, the risk of failures may be compared to historical risk of failures for a further ranking assessment. As will be described below in connection with FIGS. 6 and 9, the risk ranking ranks devices D1-DN from a high risk of failure to a low risk failure based on the composite risks of failure for the devices.

Based on the risk ranking, ERAM 114 alone, or in concert with recommendation system 116 and ACT 118, may send recommendation messages to an administrator (e.g., a live administrator or an administrator management application hosted on a server and configured to manage devices D1-DN) to reconfigure hardware, software, and/or network configuration features of one or more of the devices having respective risk of failures coinciding with the high risk of failure in the risk ranking. Such devices may have risk of failures in an outlier range of risk of failure. The recommendation messages include device fingerprints and identifiers for the one or more device so that the administrator may access/communicate with those specific devices in their respective networks. The recommendation messages may also recommend updating various ones of the hardware, software, and/or network configuration features deemed to be problematic based on information about devices failures gleaned from the ERAM methods. Responsive to the recommendation messages, the system (e.g., the administrator and/or even ERAM 114) may reconfigure the features of the one or more of the devices in accordance with the recommendation message to reduce the future risk of failures in those devices. In an example, the system may automatically download new/updated versions of operating software to the one or more devices over network 106, or may automatically reconfigure the network configurations of the one or more devices from OSPF to BGP, and so on. In addition, hardware re-configuration of the one or more devices may be performed manually based on the recommendations.

Returning to the cluster profile composition scoring method of 504, each type of cluster processing (e.g., Kmeans 522, LSI 524, and LDA 526) generally includes the following operations shown in FIG. 5:

a. At row of operations 504A, clustering the device fingerprints into multiple clusters based on the hardware, the software, and the network configuration features, but not the failure features indicated in the device fingerprints.

b. At row of operations 504B, generating for each cluster from operation 504A a respective statistical cluster failure rate (referred to as "Cluster Risk Frequency" or "Per Cluster Risk Probability" in FIG. 5) based on the failure features indicated in all of the device fingerprints in the cluster. To do this, in one example, operation 504B accumulates for each cluster a total number of failure features (i.e., fail indicators) across device fingerprints belonging to the cluster.

c. At row of operations 504C, assigning to each device fingerprint the respective statistical cluster failure rate of the cluster to which the device fingerprint belongs, which represents the above-mentioned respective risk of failure of the device corresponding to the device fingerprint.

More specifically, clustering under Kmeans 522 includes the following operations and features:

a. All SIV data is clustered based on Euclidean distance of the SIV vectors from each other.

b. Indicated failure features (also referred to as "crash labels") while present, are not used during clustering.

c. M number of clusters per device type is generated. An optimal number of clusters per device type is generated and used, e.g., some device types may group nicely into 4 clusters, while others may form 6. In an example, an initial iteration through ensemble methods 510 is based on 6 primary clusters. This number will be adjusted as optimal clusters for device type are learned over time. Ultimately, there may be 2 or more clusters for each device type (e.g., 2900 series routers, 800 series routers, and so on).

d. The crash labels/failure features are used to assign a statistical failure rate per cluster (also referred to as "crash rate per cluster").

e. Any new device fingerprint/SIV is evaluated to allocate the new SIV to a cluster, and the crash rate from that cluster is assigned to the SIV.

Clustering under LSI 524 (also including Latent Semantic Indexing (LSI)) includes the following operations and features:

a. SIVs are used to cluster devices based on latent concept relationships of the features in the SIV.

b. This results in different clusters from those of Kmeans or LDA.

c. N number of clusters per device type is generated.

d. The crash labels are used to assign a statistical crash rate per cluster.

e. Any new SIV is evaluated to allocate the new SIV to a cluster, and the crash rate from that cluster is assigned.

Clustering under LDA 526 includes the following operations and features:
  a. SIVs are used to cluster devices based on common topic groups of the features across the SIVs.
  b. This results in different clusters from Kmeans or LSI.
  c. N number of clusters per device type are generated.
  d. The crash labels are used to assign a statistical crash rate per cluster.
  e. Any new SIV is evaluated to allocate the new SIV to a cluster, and the crash rate from that cluster is assigned.

Returning to nearest neighbor scoring 520 of operation 504, the nearest neighbor scoring includes, for each device fingerprint:
  a. At 520A, determining similarity to each other device fingerprint, and which of the other device fingerprints are nearest neighbors based on results of the determining the similarity.
  b. At 520B, determining a failure rate of the nearest neighbors based on their failure indicators.
  c. At 520C, assigning the failure rate from 520B to the device fingerprint as the respective risk of failure of the device corresponding to the device fingerprint.

More specifically, nearest neighbor scoring 520 includes the following operations and features:
  a. No clusters as described above in cluster processing are generated. The entire set of known SIVs is used.
  b. Similarity may be based on a cosine similarity of each SIV being evaluated against all other SIVs.
  c. For each SIV, M (e.g., 100) nearest neighbor SIVs are identified, representing a custom group or cluster of devices most like the given SIV.
  d. The crash labels are used to assign a statistical crash rate to the custom cluster, and thus the device corresponding to the custom cluster.

Returning to tree-based machine learning risk scoring method 530 and neural network-based or perceptron-based scoring method 532 of operation 504, generally, each type of machine learning scoring includes:
  a. At row 540 (e.g., see "Classification+Weighting"), in a training phase, training the machine learning scoring based on the hardware, the software, the network configuration, and the failure indicators of a training set of device fingerprints, to produce classification models configured to predict a risk of failure for a given device fingerprint based on the hardware, the software, and the network configuration features of the given device fingerprint.
  b. At row 542 (e.g., see "Per Classification Risk Probability"), using the classification model produced by the training, predicting for each device fingerprint a respective risk of failure as the respective risk of failure of the device corresponding to the device fingerprint.

More specifically, tree-based machine learning scoring 530 includes the following operations and features:
  a. Uses a decision tree, a random forest, or other ensemble algorithm.
  b. Perform "careful engineering" (i.e., "feature engineering") to select a subset of all available features/feature attributes of the SIVs.
  c. Both training and predicting uses the crash labels in the SIVs.
  d. Classification model is built on all known SIVs, and only the interesting (selected) features from the careful engineering.
  e. After training, the classification model is used to predict a probability/risk of failure for each SIV based on configuration, hardware, and software features.
  f. The process represents an engineering statement: "I think I have identified the important features that will allow me to predict crash" predictive analytics.

More specifically, perceptron-based machine learning scoring 532 includes the following operations and features:
  a. Uses standard neural networks for pattern matching.
  b. Does not use feature engineering. Uses all features and feature attributes of the SIV to build models.
  c. Crash labels in the SIVs are used.
  d. Classification models are built on all known SIVs.
  e. Classification models are used to provide a probability of crash prediction for any individual SIV.
  f. The process represents the engineering statement: "let me throw everything at the machines and see what they come up with" method.

In an example, all of the respective risk of failures (i.e., risk of failure scores) are normalized to fall in a range of 0 to 1.

Figure 6:
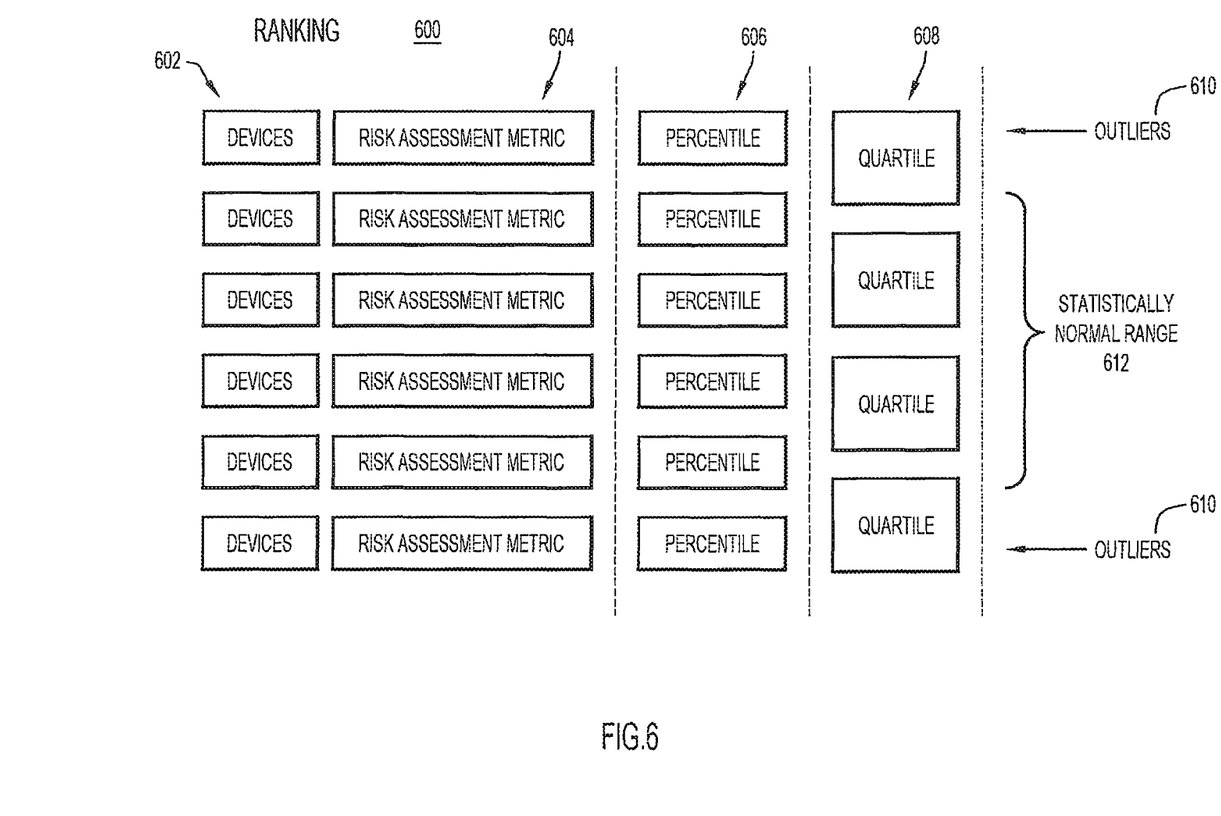
FIG. 6 is an illustration of device rankings produced by a ranking operation of the ERAM, according to an example embodiment.

With reference to FIG. 6, there is an illustration of example device rankings 600 produced by ranking operation 508. Device rankings 600 may include a ranking of identifiers 602 for devices D1-DN organized such that their corresponding composite risk assessment metrics 604 (i.e., composite risk of failures) decrease from highest to lowest moving down the rankings. Device rankings 600 also include percentile rankings 606 and quartile rankings 608 of devices D1-DN based on their composite risk of failures. Based on the aforementioned rankings, ERAM 114 may determine/identify devices 610 among devices D1-DN having composite risk of failures that are high risk and low risk, and devices 612 having composite risk of failures in a statistically normal range between the outliers.

An operational example in which ERAM 114 processes each of device fingerprints D1-D5 from FIG. 4 is now described in connection with FIGS. 7-9.

Beginning with FIG. 7, there is an illustration of an example of a training phase for ERAM 114 in which the ERAM processes device fingerprints D1-D5 to generate initial information for use later in an application phase described below in connection with FIG. 8. In the training phase: tree-based machine learning risk scoring method 530 and neural network-based or perceptron-based scoring method 532 generate corresponding predictive models based on device fingerprints D1-D5; cluster-based risk scoring methods 522, 524, and 526 each generate corresponding clusters of the device fingerprints, and then each compute corresponding per cluster failure/crash rates; and nearest neighbor risk scoring method 520 generates an all device fingerprint index. To do this, a collection of all known device fingerprints may be queried to return the top nearest neighbors to a given SIV (e.g., 100 nearest neighbors), and the crash rate seen across that group of nearest neighbors is used for this number.

Figure 7:
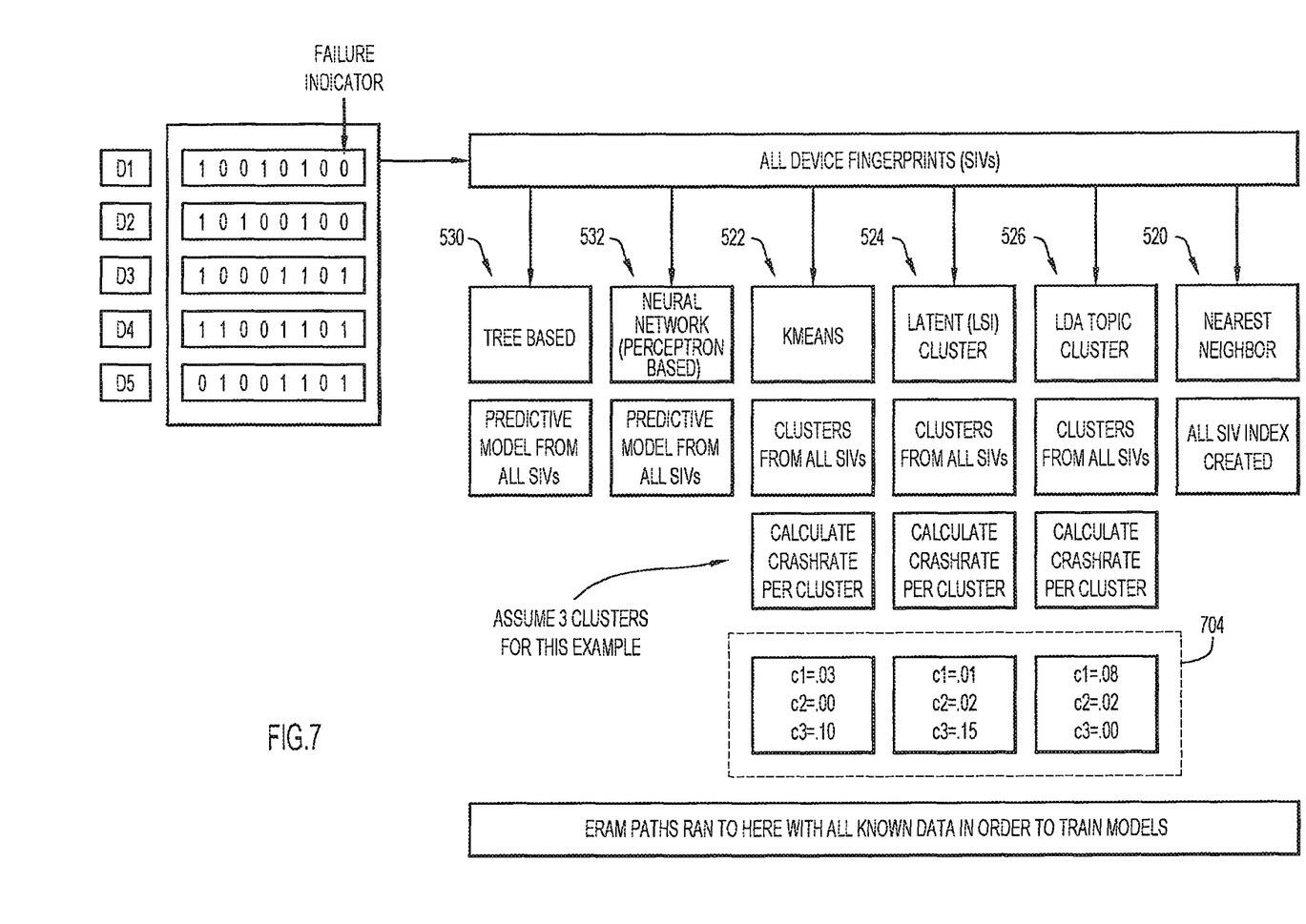
FIG. 7 is an illustration of a training phase for the ERAM, according to an example embodiment.

The example of FIG. 7 assumes that cluster-based risk scoring methods 522, 524, and 526 each generates 3 respective clusters c1, c2, and c3 and each computes a respective crash rate per cluster. For example, as shown at 704, risk scoring method 522 generates respective clusters c1, c2, and c3 having respective crash rates 0.03, 0.00, and 0.10, risk scoring method 524 generates respective clusters c1, c2, and c3 having respective crash rates 0.01, 0.02, and 0.15, and so on.

Figure 8:
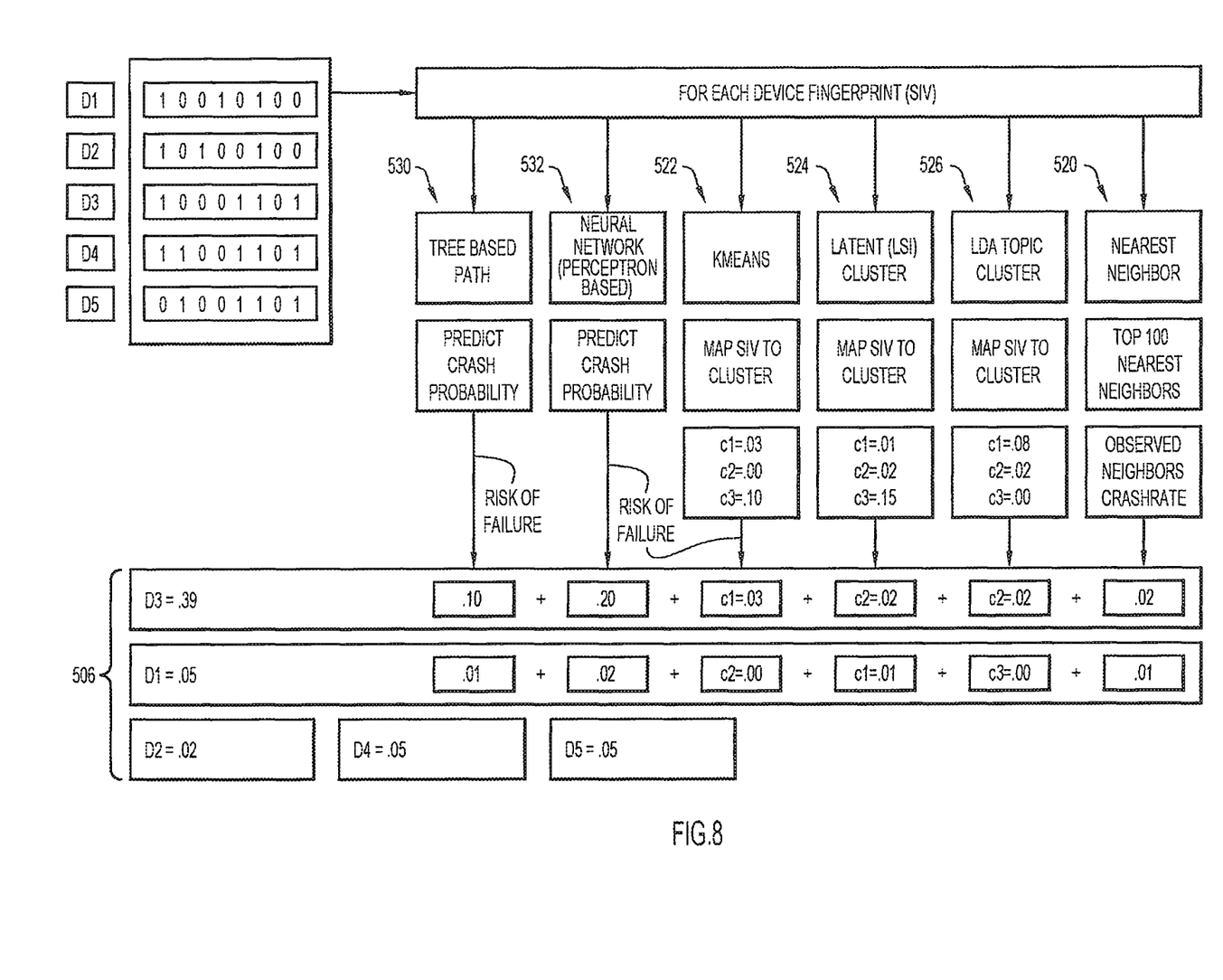
FIG. 8 is an illustration of an application phase for ERAM that uses information from the training phase, according to an example embodiment.

With reference to FIG. 8, there is an illustration of an example of the application phase for ERAM 114 that uses the information generated in the training phase described above. In the application phase, risk scoring methods 520-530 each processes each of device fingerprints D1-D5, to produce for each device fingerprint a respective risk of failure, and provide the risk of failures to operation 506. Operation 506 combines (e.g., adds together) the respective risk of failures for each device fingerprint into a respective composite risk of failure. In the example of FIG. 8, risk scoring methods 520, 522, 524, 526, 530, and 532 generate for:

a. Device fingerprint D1 respective risk of failures 0.01, 0.00, 0.01, 0.00, 0.01, and 0.02, which combine to a composite risk of failure of 0.05 for device D1.
b. For device fingerprint D2, respective risk of failures (not specifically show in FIG. 8), which combine to a composite risk of failure of 0.02 for device D2.
c. For device fingerprint D3, respective risk of failures 0.02, 0.03, 0.02, 0.02, 0.10, and 0.20, which combine to a composite risk of failure of 0.39 for device D3.
d. For device fingerprint D4, respective risk of failures (not specifically show in FIG. 8), which combine to a composite risk of failure of 0.05 for device D4.
e. For device fingerprint D5, respective risk of failures (not specifically show in FIG. 8), which combine to a composite risk of failure of 0.05 for device D5.

Figure 9:
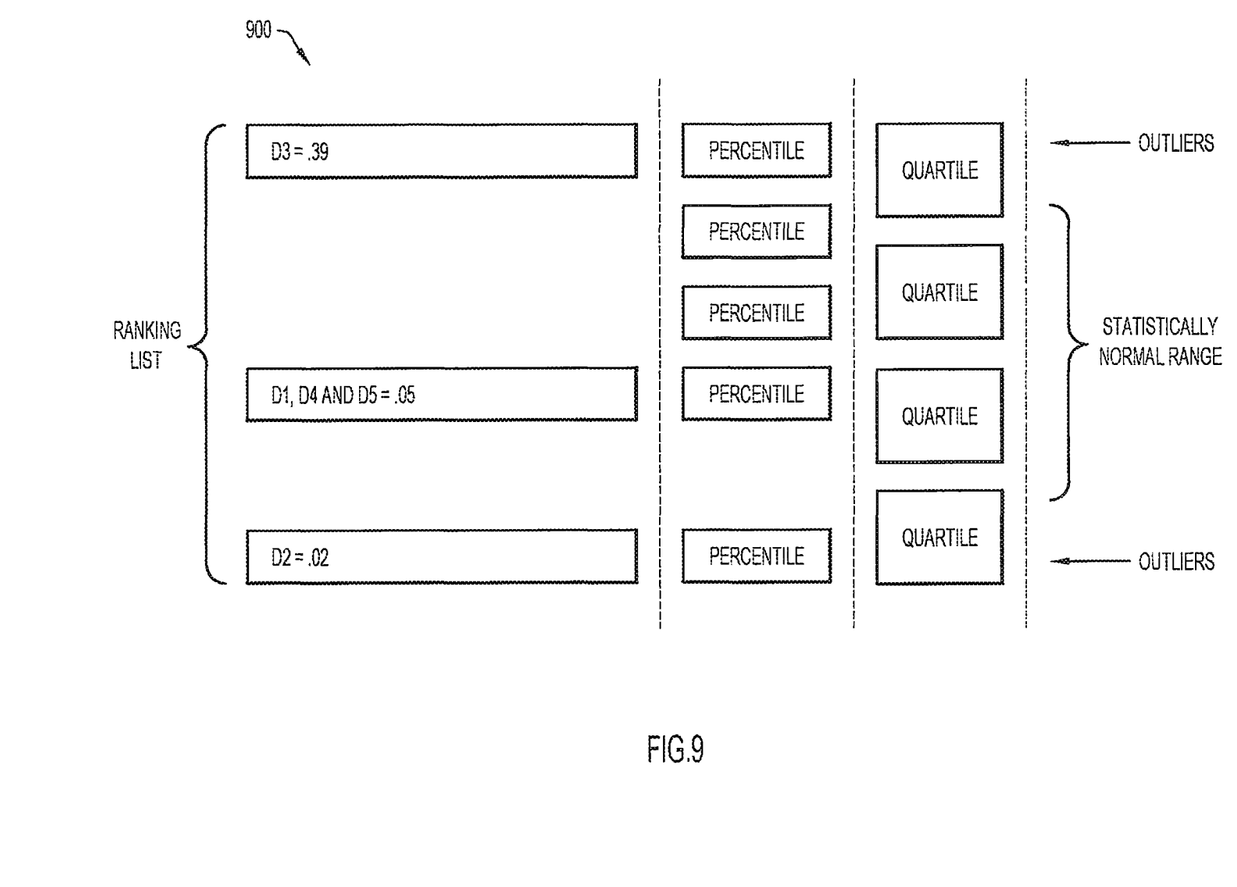
FIG. 9 is an illustration of rankings of composite risk of failures generated by the ranking operation in the application phase, according to an example embodiment.

With reference to FIG. 9, there is an illustration of example rankings 900 of the composite risk of failures for devices D1-D5 from FIG. 8, as generated by ranking operation 508. Rankings 900 include a list of devices D1-D5 ranked from highest composite risk of failure (device D3) down to lowest composite risk of failure (device D2). Rankings 900 indicate that device D3 has a composite risk of failure in a high-level outlier range, devices D1, D4, and D5 have composite risk of failures in a statistically normal range, and device D2 has a composite of risk of failure in a low-level outlier range.

Figure 10:
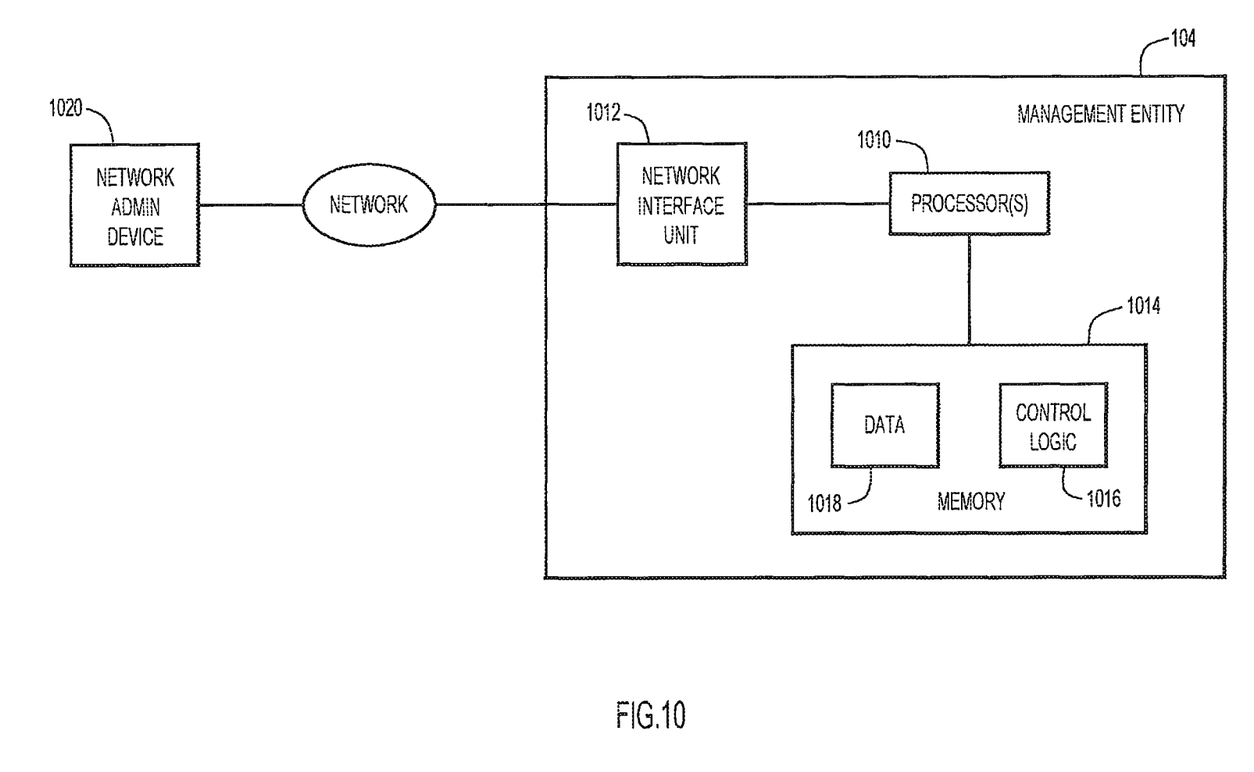
FIG. 10 is a block diagram of management entity that performs the ERAM, according to an example embodiment.

With reference to FIG. 10, there is shown a hardware block diagram for management entity 104, according to an embodiment. In an example, management entity 104 includes a computer system, such as a server, having one or more processors 1010, a network interface unit (NIU) 1012, and a memory 1014. Memory 1014 stores control software 1016 (referred as "control logic"), that when executed by the processor(s) 1010, causes the computer system to perform the various operations described herein for management entity 104.

The processor(s) 1010 may be a microprocessor or microcontroller (or multiple instances of such components). The NIU 1012 enables management entity 110 to communicate over wired connections or wirelessly with a network. NIU 1012 may include, for example, an Ethernet card or other interface device having a connection port that enables management entity 110 to communicate over the network via the connection port. In a wireless embodiment, NIU 1012 includes a wireless transceiver and an antenna to transmit and receive wireless communication signals to and from the network.

The memory 1014 may include read only memory (ROM), random access memory (RAM), magnetic disk storage media devices, optical storage media devices, flash memory devices, electrical, optical, or other physically tangible (i.e., non-transitory) memory storage devices. Thus, in general, the memory 1014 may comprise one or more tangible (non-transitory) computer readable storage media (e.g., memory device(s)) encoded with software or firmware that comprises computer executable instructions. For example, control software 1016 includes logic to implement components of ECARE 110 including ERAM 114. Thus, control software 1016 implements the various methods/operations described above. Control software 1016 also includes logic to implement/generate for display graphical user interfaces (GUIs) as necessary in connection with the above described methods/operations.

Memory 1014 also stores data 1018 generated and used by control software 1016, including.

A user, such as a network administrator, may interact with management entity 104, to receive reports, change algorithms, and so on, through GUIs by way of a user device 1020 (also referred to as a "network administration device") that connects by way of a network with management server 108. The user device 1020 may be a personal computer (laptop, desktop), tablet computer, SmartPhone, and the like, with user input and output devices, such as a display, keyboard, mouse, and so on. Alternatively, the functionality and a display associated with user device 1020 may be provided local to or integrated with management entity 104.

In summary, in order to proactively address networked device failures, the ERAM combines multiple, e.g., 6, statistical and machine learning device risk assessment methods into one ensemble method that produces a weighted risk assessment metric or composite risk of failure per device. ERAM blends the multiple statistical and machine learning methods to account for data biases and variances that could impact risk assessments. The methods include cluster profile composition scoring, nearest neighbor scoring, tree-based machine learning scoring, and perceptron-based machine learning scoring that examine device hardware, software, configuration, and failure features within SIV data, as follows.

For Cluster profile composition scoring:
a. Ingest platform-specific SIVs data.
b. Reduce dimensions of SIV data by using statistical transformations.
c. Clustering has three scores from three dimensions—Dimension-reduced, Latent Factors, and Common Topics, e.g., using Kmeans, LSI, or LDA.
d. Create device risk groups by using clustering algorithms.
e. Clustering algorithms/approaches are applied to each reduction method separately in order to obtain separate grouping results.
f. Calculate risk frequency/probability for groups.
g. Calculate risk score for device based on cluster composition.

For nearest-neighbor scoring:
a. Ingest platform-specific SIV data.
b. Group top 1000, for example, nearest-neighbors and analyze risk profile.
c. Calculate risk probability for nearest-neighbor groups.

For tree-based machine learning scoring:
a. Ingest platform-specific SIV data and pair with cluster groups found in dimension-reduced transformation.
b. Apply trained ensemble trees (such as random forest) classification algorithm to calculate probability of device failing or not failing (risk score creation).

For perceptron-based machine learning scoring:
a. Ingest platform-specific SIV data.
b. Apply Neural Networks classification algorithm to calculate probability of device failing or not failing (risk score creation).

In one form, a computer-implemented method is provided comprising: at a management entity: receiving device fingerprints representing corresponding devices connected to one or more networks, each device fingerprint including a multi-bit word indicating hardware, software, network configuration, and failure features for a corresponding one of the devices; processing the device fingerprints using different methods including statistical risk of failure scoring methods and machine learning risk of failure scoring methods, to produce from each of the methods a respective risk of failure for each device; combining the respective risk of failures for each device into a composite risk of failure for each device; ranking the devices based on the composite risk of failures for the devices, to produce a risk ranking of the devices; and outputting the risk ranking.

In another form, an apparatus is provided comprising: a network interface configure to send data to and receive data from a network; and a processor coupled to the network interface unit and configure to: receive fingerprints representing corresponding devices connected to one or more networks, each device fingerprint including a multi-bit word indicating hardware, software, network configuration, and failure features for a corresponding one of the devices; process the device fingerprints using different methods including statistical risk of failure scoring methods and machine learning risk of failure scoring methods, to produce from each of the methods a respective risk of failure for each device; and combine the respective risk of failures for each device into a composite risk of failure for each device; rank the devices based on the composite risk of failures for the devices, to produce a risk ranking of the devices; and output the risk ranking.

In yet another form, a non-transitory tangible computer readable storage media encoded with instructions is provided. The instructions, when executed by a processor of a management entity, cause the processor to perform: receiving device fingerprints representing corresponding devices connected to one or more networks, each device fingerprint including a multi-bit word indicating hardware, software, network configuration, and failure features for a corresponding one of the devices; processing the device fingerprints using different methods including statistical risk of failure scoring methods and machine learning risk of failure scoring methods, to produce from each of the methods a respective risk of failure for each device; combining the respective risk of failures for each device into a composite risk of failure for each device; ranking the devices based on the composite risk of failures for the devices, to produce a risk ranking of the devices; and outputting the risk ranking.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A computer-implemented method comprising:
at a management entity:
receiving device fingerprints representing corresponding devices connected to one or more networks, each device fingerprint including a multi-bit word indicating hardware, software, network configuration, and failure features for a corresponding one of the devices;
processing the device fingerprints using statistical risk of failure scoring methods to produce risk of failures for each device;
processing the device fingerprints using machine learning risk of failure scoring methods that are different from the statistical risk of failure scoring methods to produce risk of failures for each device;
combining into a composite risk of failure for each device the risk of failures produced by the statistical risk of failure scoring methods and the risk of failures produced by the machine learning risk of failure scoring methods;
ranking the devices based on the composite risk of failures for the devices, to produce a risk ranking of the devices; and
outputting the risk ranking.

2. The method of claim 1, wherein:
the processing using the statistical risk of failure scoring methods includes processing using one or more types of cluster profile composition scoring methods and using a nearest neighbor scoring method; and
the processing using the machine learning risk of failure scoring methods includes processing using one or more of tree-based machine learning scoring and perceptron-based machine learning scoring methods.

3. The method of claim 2, wherein:
the one or more types of cluster profile composition scoring methods include Kmeans based on Euclidean distance, Latent Semantic Indexing analysis, and Latent Dirichlet Allocation analysis.

4. The method of claim 2, wherein each type of cluster profile composition scoring method includes:
clustering the device fingerprints into multiple clusters based on the hardware, the software, and the network configuration features indicated by the device fingerprints;
generating for each cluster a respective statistical cluster failure rate based on the failure features of all of the device fingerprints in the cluster; and
assigning to each device fingerprint the respective statistical cluster failure rate of the cluster to which the device fingerprint belongs as the respective risk of failure of the device corresponding to the device fingerprint.

5. The method of claim 4, wherein the clustering includes clustering the device fingerprints into multiple cluster risk groups based on the hardware, the software, and the network configuration, but not the failure features, of the device fingerprints.

6. The method of claim 2, wherein each machine learning risk of failure scoring method includes:
training the machine learning risk of failure scoring method based on the hardware, the software, the network configuration, and the failure features of a training set of device fingerprints, to produce classification models configured to predict a risk of failure for a given device fingerprint based on the hardware, the software, and the network configuration features indicated in the given device fingerprint; and
using the classification model, predicting for each device fingerprint a respective risk of failure as the respective risk of failure of the device corresponding to the device fingerprint.

7. The method of claim 2, wherein the nearest neighbor scoring method includes, for each device fingerprint:
determining similarity to each other device fingerprint;
determining which of the other device fingerprints are nearest neighbors based on results of the determining the similarity; and
determining a failure rate of the nearest neighbors based on the failure features of the nearest neighbors, and assigning the failure rate to the device fingerprint as the respective risk of failure of the device corresponding to the device fingerprint.

8. The method of claim 2, wherein each device fingerprint includes the multi-bit word having bits that represent respective ones of the hardware, the software, the network configuration, and the failure features of the corresponding device, and wherein the bit of the multi-bit word that represents the failure features indicates whether or not the corresponding device has experienced a failure.

9. The method of claim 8, wherein each device fingerprint is mapped to a device identifier of the corresponding device represented by the device fingerprint.

10. The method of claim 9, wherein the bits of the multi-bit word of each device fingerprint have respective values that represent absences or presences of the respective ones of the hardware, the software, and the network configuration features.

11. The method of claim 1, wherein the risk ranking ranks the devices from a high risk of failure to a low risk failure based on the composite risks of failure for the devices, and the method further comprises:
   sending recommendations to reconfigure one or more features of one or more of the devices having respective risk of failures coinciding with the high risk of failure in the risk ranking; and
   reconfiguring the one or more features of the one or more of the devices in accordance with recommendations to reduce risk of failures of the devices.

12. An apparatus comprising:
   a network interface unit configured to send data to and receive data from a network; and
   a processor coupled to the network interface unit and configured to:
      receive fingerprints representing corresponding devices connected to one or more networks, each device fingerprint including a multi-bit word indicating hardware, software, network configuration, and failure features for a corresponding one of the devices;
      process the device fingerprints using statistical risk of failure scoring methods to produce risk of failures for each device;
      process the device fingerprints using machine learning risk of failure scoring methods that are different from the statistical risk of failure scoring methods to produce risk of failures for each device;
      combine into a composite risk of failure for each device the risk of failures produced by the statistical risk of failure scoring methods and the risk of failures produced by the machine learning risk of failure scoring methods;
      rank the devices based on the composite risk of failures for the devices, to produce a risk ranking of the devices; and
      output the risk ranking.

13. The apparatus of claim 12, wherein the processor is configured to:
   process using the statistical risk of failure scoring methods by processing using one or more types of cluster profile composition scoring methods and using a nearest neighbor scoring method; and
   process using the machine learning risk of failure scoring methods by processing using one or more of tree-based machine learning scoring and perceptron-based machine learning scoring methods.

14. The apparatus of claim 13, wherein:
   the one or more types of cluster profile composition scoring methods include Kmeans based on Euclidean distance, Latent Semantic Indexing analysis, and Latent Dirichlet Allocation analysis.

15. The apparatus of claim 13, wherein the processor is configured to process using each type of cluster profile composition scoring method by:
   clustering the device fingerprints into multiple clusters based on the hardware, the software, and the network configuration features indicated by the device fingerprints;
   generating for each cluster a respective statistical cluster failure rate based on the failure features of all of the device fingerprints in the cluster; and
   assigning to each device fingerprint the respective statistical cluster failure rate of the cluster to which the device fingerprint belongs as the respective risk of failure of the device corresponding to the device fingerprint.

16. The apparatus of claim 13, wherein the processor is configured to process using each machine learning risk of failure scoring method by:
   training the machine learning risk of failure scoring method based on the hardware, the software, the network configuration, and the failure features of a training set of device fingerprints, to produce classification models configured to predict a risk of failure for a given device fingerprint based on the hardware, the software, and the network configuration features indicated in the given device fingerprint; and
   using the classification model, predicting for each device fingerprint a respective risk of failure as the respective risk of failure of the device corresponding to the device fingerprint.

17. The apparatus of claim 13, wherein the processor is configured to process using the nearest neighbor scoring method by, for each device fingerprint:
   determining similarity to each other device fingerprint;
   determining which of the other device fingerprints are nearest neighbors based on results of the determining the similarity; and
   determining a failure rate of the nearest neighbors based on the failure features of the nearest neighbors, and assigning the failure rate to the device fingerprint as the respective risk of failure of the device corresponding to the device fingerprint.

18. The apparatus of claim 13, wherein each device fingerprint includes the multi-bit word having bits that represent respective ones of the hardware, the software, the network configuration, and the failure features of the corresponding device, and wherein the bit of the multi-bit word that represents the failure features indicates the failure feature indicates whether or not the corresponding device has experienced a failure.

19. A non-transitory computer readable medium encoded with instructions that, when executed by a processor, cause the processor to perform:
   receiving device fingerprints representing corresponding devices connected to one or more networks, each device fingerprint including a multi-bit word indicating hardware, software, network configuration, and failure features for a corresponding one of the devices;
   processing the device fingerprints using statistical risk of failure scoring methods to produce risk of failures for each device;
   processing the device fingerprints using machine learning risk of failure scoring methods that are different from the statistical risk of failure scoring methods to produce risk of failures for each device;
   combining into a composite risk of failure for each device the risk of failures produced by the statistical risk of failure scoring methods and the risk of failures produced by the machine learning risk of failure scoring methods;

ranking the devices based on the composite risk of failures for the devices, to produce a risk ranking of the devices; and outputting the risk ranking.

20. The non-transitory computer readable medium of claim 19, wherein:

the processing using the statistical risk of failure scoring methods includes processing using one or more types of cluster profile composition scoring methods and using a nearest neighbor scoring method; and the processing using the machine learning risk of failure scoring methods includes processing using one or more of tree-based machine learning scoring and perceptron-based machine learning scoring methods.

\* \* \* \* \*

UNITED STATES PATENT AND TRADEMARK OFFICE
CERTIFICATE OF CORRECTION

PATENT NO. : 10,769,006 B2
APPLICATION NO. : 16/050370
DATED : September 8, 2020
INVENTOR(S) : Nidhi Kao et al.

Page 1 of 1

It is certified that error appears in the above-identified patent and that said Letters Patent is hereby corrected as shown below:

In the Claims

Claim 18, Column 14, Lines 48-49, please delete "the failure feature indicates" after "indicates"

Signed and Sealed this
Third Day of August, 2021

Drew Hirshfeld
*Performing the Functions and Duties of the*
*Under Secretary of Commerce for Intellectual Property and*
*Director of the United States Patent and Trademark Office*